(12) United States Patent
Fruehauf et al.

(10) Patent No.: US 8,217,356 B2
(45) Date of Patent: Jul. 10, 2012

(54) RADIATION DETECTOR INCLUDING ELONGATED ELEMENTS

(75) Inventors: Diane Fruehauf, Streetsboro, OH (US); Peter R. Menge, Chagrin Falls, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 12/539,386

(22) Filed: Aug. 11, 2009

(65) Prior Publication Data
US 2010/0032577 A1     Feb. 11, 2010

Related U.S. Application Data

(60) Provisional application No. 61/087,885, filed on Aug. 11, 2008.

(51) Int. Cl.
*G01T 1/202* (2006.01)
(52) U.S. Cl. .................................. 250/361 R
(58) Field of Classification Search .................. 250/253, 250/254, 255, 256, 361 R, 368; 29/428
See application file for complete search history.

(56) References Cited

U.S. PATENT DOCUMENTS

| | | | |
|---|---|---|---|
| 3,626,743 A * | 12/1971 | Koch | 72/330 |
| 4,004,151 A | 1/1977 | Novak | |
| 4,158,773 A | 6/1979 | Novak | |
| 4,383,175 A | 5/1983 | Toepke | |
| 4,764,677 A | 8/1988 | Spurney | |
| 5,280,890 A | 1/1994 | Wydra | |
| 5,651,535 A | 7/1997 | David | |
| 6,355,932 B1 | 3/2002 | Frederick | |
| 6,839,362 B2 | 1/2005 | Kokta et al. | |
| 6,844,084 B2 | 1/2005 | Kokta et al. | |
| 6,877,901 B2 | 4/2005 | Wollenweber | |
| 2002/0030400 A1 * | 3/2002 | Frederick et al. | 299/95 |
| 2006/0192126 A1 * | 8/2006 | Medley et al. | 250/361 R |

OTHER PUBLICATIONS

"USA Tolerance Rings", Catalog, 20 pgs. <www.usatolerancerings.com.

* cited by examiner

*Primary Examiner* — David Porta
*Assistant Examiner* — Marcus Taningco
(74) *Attorney, Agent, or Firm* — Abel Law Group, LLP; Christopher Cianciolo

(57) ABSTRACT

A detector includes a housing defining a cavity; a scintillator material disposed within the cavity and having a front face, a rear face, and a side face; a reflective material disposed between the housing and the side face of the scintillator material; and a tolerance ring disposed between the housing and the reflective material.

17 Claims, 7 Drawing Sheets

 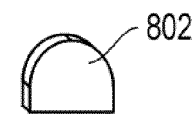 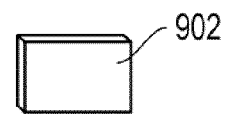
FIG. 7  FIG. 8  FIG. 9
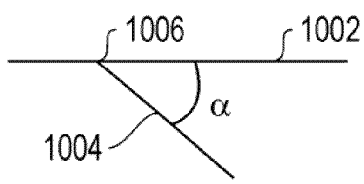 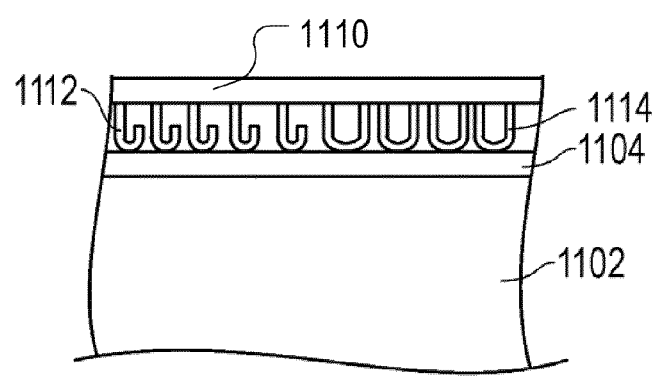
FIG. 10
FIG. 11
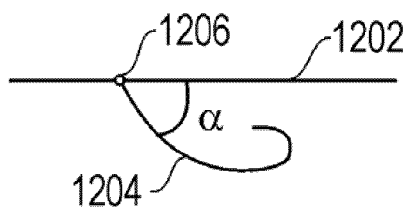 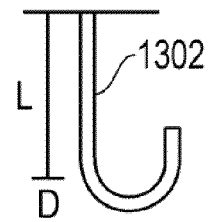
FIG. 12
FIG. 13

RADIATION DETECTOR INCLUDING ELONGATED ELEMENTS

CROSS-REFERENCE TO RELATED APPLICATION(S)

The present application claims priority from U.S. Provisional Patent Application No. 61/087,885, filed Aug. 11, 2008, entitled "RADIATION DETECTOR INCLUDING ELONGATED ELEMENTS," naming inventors Diane Fruehauf and Peter R. Menge, which application is incorporated by reference herein in its entirety.

FIELD OF THE DISCLOSURE

The present disclosure, in general, relates to scintillators and in particular, to ruggedized scintillator devices for industrial applications.

BACKGROUND

Scintillation detectors have been employed in various industrial applications, such as the oil and gas industry for well logging. Typically, these detectors have scintillator crystals made of an activated sodium iodide material that is effective for detecting gamma rays. Generally, the scintillator crystals are enclosed in tubes or casings, which include a window permitting radiation induced scintillation light to pass out of the crystal package for measurement by a light-sensing device, such as a photomultiplier tube. The photomultiplier tube converts the light photons emitted from the crystal into electrical pulses that are shaped and digitized by associated electronics and that may be registered as counts and transmitted to analyzing equipment. In terms of well logging applications, the ability to detect gamma rays makes it possible to analyze rock strata as gamma rays are emitted from naturally occurring radioisotopes, typically of shales that surround hydrocarbon reservoirs.

Today, a common practice is to make measurements while drilling (MWD). For MWD applications, the detector should be ruggedized, that is, it should have a high shock resistance and be capable of withstanding high temperatures, while maintaining performance specifications for a reasonable lifetime.

SUMMARY

In a particular embodiment, a detector includes a housing defining a cavity; a scintillator material disposed within the cavity and having a front face, a rear face, and a side face; a reflective material disposed between the housing and the side face of the scintillator material; and a tolerance ring disposed between the housing and the reflective material.

In another embodiment, a method of forming a detector includes placing a reflective material over at least a portion of a side face of a scintillator material, inserting the reflective material and the scintillator material into a tolerance ring, and inserting the tolerance ring into a housing.

In a further exemplary embodiment, a detector includes a scintillator material including a front face, a rear face, and a side face; a reflective material disposed around at least a portion of the side face of the scintillator material; and a cover disposed around the reflective material. The cover biases the scintillator material to align with an axis of the detector. The cover includes a plurality elements. Each element of the plurality of elements has an aspect ratio of at least 4.

In an additional embodiment, a detector includes a cover defining a cavity and comprising a hook or loop material; a scintillator material disposed within the cavity and comprising a front face, a rear face, and a side face; and a reflective material disposed between the cover and the side face of the scintillator material.

In another embodiment, a detector includes a housing defining a cavity; a scintillator material disposed in the housing and including a front face, a rear face, and a side face; a reflective material disposed between the housing and the side face of the scintillator material; and a radial biasing member disposed between the reflective material and the housing. The radial biasing member biases the scintillator material to align with an axis of the detector. The radial biasing member includes a plurality elements. Each element of the plurality of elements includes a flap pivotably attached to a base material.

In a further embodiment, a method of forming a detector includes placing a reflective material on at least a portion of a side face of a scintillator material and placing a cover over the reflective material. The cover includes a plurality of elements to radially bias the scintillator material. Each element has an aspect ratio of at least 4.

BRIEF DESCRIPTION OF THE DRAWINGS

The present disclosure may be better understood, and its numerous features and advantages made apparent to those skilled in the art by referencing the accompanying drawings.

FIG. 7, FIG. 8, FIG. 9, and FIG. 10 include illustrations of exemplary pivotably attached flap configurations.

FIG. 11 includes an illustration of an exemplary housing according to an embodiment.

FIG. 12 and FIG. 13 include illustrations of an exemplary hook or loop element according to the embodiment of FIG. 11.

The use of the same reference symbols in different drawings indicates similar or identical items.

DESCRIPTION OF THE EMBODIMENTS

According to a one aspect, a radiation detector is disclosed that includes a photomultiplier tube, and a scintillator device coupled to the photomultiplier tube. The scintillator device includes a scintillator material, a radial biasing member substantially surrounding the scintillator material, and a casing substantially surrounding the radial biasing member. The casing has a window in one end. Further, the scintillator device includes an axial biasing member to bias the scintillator material toward the window. In an example, the radial biasing member is a tolerance ring and includes corrugated elements. In another example, the radial biasing member includes a set of pivotably attached flaps. In a further example, the radial biasing member includes a set of hook or loop elements. In an alternative example, the hook or loop elements are incorporated into the casing, and the scintillator device is free of a radial biasing member.

A problem associated with MWD applications is that the detector reports a higher than actual count rate when the scintillation device detects false counts resulting from vibration. Falsely high readings may occur when the detector output is composed of radiation-induced counts and vibration-induced counts. Moreover, the problem is exaggerated when detecting low-level radiation events while the detector is subject to a severe operational environment, such as drilling.

To reduce the problem of false counts, techniques can be used to secure or immobilize the scintillator materials. Conventional techniques can lead to fracturing and changes in the morphology of the scintillator materials. As a result, the durability and lifetime of the scintillator device can be poor. In relation to immobilization of the scintillator materials, there is a trade-off between spurious counts and damage to the scintillator material. Many conventional systems sacrifice some accuracy to retain durability.

According to aspects of embodiments of the scintillator devices disclosed herein, a ruggedized scintillator device can withstand the harsh environments of industrial applications, such as high shock and high temperature applications common in drilling, while providing few vibration induced false counts. In addition, the ruggedized scintillator device maintains performance over an extended lifetime.

Figure 1:
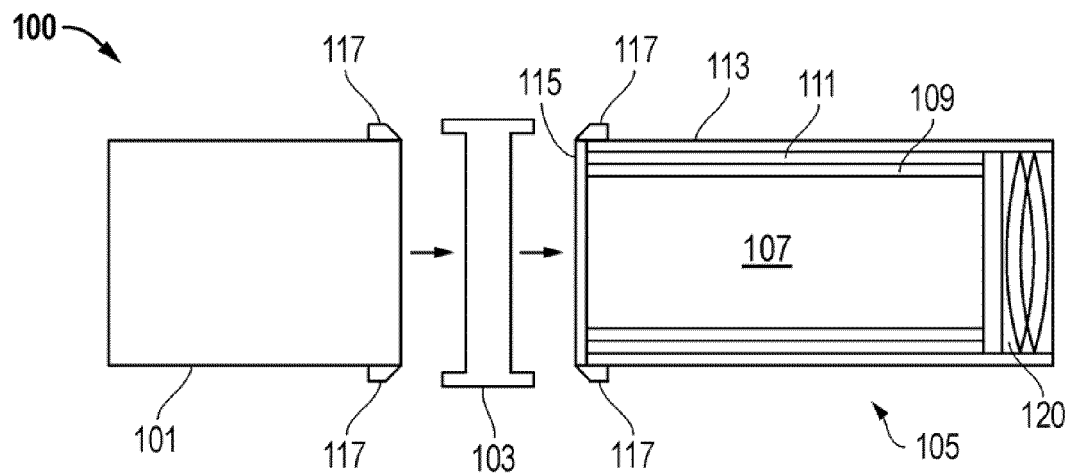
FIG. 1 includes an illustration of a detector according to one embodiment.

Referring to the figures, FIG. 1 illustrates a radiation detector 100 according to one embodiment. As illustrated the radiation detector includes a photosensor 101, light pipe 103, and a scintillator housing 105. As mentioned above, the scintillator housing 105 can include a scintillator material 107 disposed within and substantially surrounded by a reflector 109 and an optional radial biasing member 111. The scintillator material 107, reflector 109, and the radial biasing member 111 are housed within a casing 113 which includes a window 115 at one end of the casing 113. An axial biasing member 120 biases the scintillator material 107 toward the window 115.

In further reference to FIG. 1, the photosensor 101 can be a device capable of spectral detection and resolution, such as a photomultiplier tube or other detection device. The photons emitted by the scintillator material 107 are transmitted through the window 115 of the scintillator housing 105, through the light pipe 103, to the photosensor 101. The photosensor 101 provides a count of the photons detected, which provides data on the radiation detected by the scintillator material 107. The photosensor 101 can be housed within a tube or housing made of a material capable of withstanding and protecting the electronics of the photosensor 101, such as a metal, metal alloy or the like. Various materials can be provided within the photosensor 101, such as within the detection device housing, to stabilize the detection device during use and ensure good optical coupling with the light pipe 103 and the scintillator housing 105.

As illustrated, the light pipe 103 is disposed between the photosensor 101 and the scintillator housing 105. The light pipe 103 can facilitate optical coupling between the photosensor 101 and the scintillator housing 105. According to one embodiment, the light pipe 103 can be coupled to the scintillator housing 105 and the photosensor 101 using biasing members 117 that provide a spring resiliency. Such biasing members 117 can facilitate absorption of shocks to the detector 100 which can reduce false readings and counts during use of the device. Alternatively, the biasing members 117 can be used in conjunction with other known coupling methods such as the use of an optical gel or bonding agent.

Figure 2:
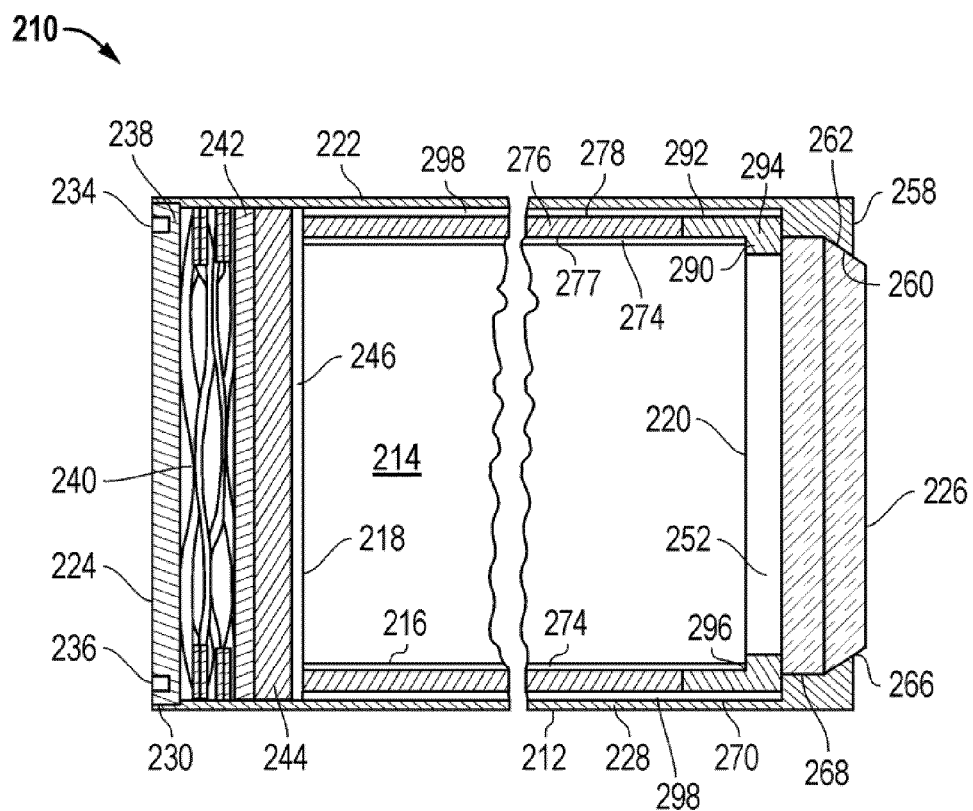
FIG. 2 includes a cross-sectional illustration of a scintillator device according to one embodiment.

In an embodiment, FIG. 2 provides an illustration of a scintillator device 210. The scintillator device 210 includes a scintillator material 214 disposed within a housing 212. An exemplary scintillator material 214 is formed of a material, such as an alkali metal halide which has been activated by the inclusion of thallium, sodium, or rare earths, such as NaI(Tl), KBr(Tl), KI(Tl), and KCl(Tl); CsI(Tl) and CsI(Na); and LiI (Eu); bismuth germinate; $LaCl_3$; $LaBr_3$; $CeBr_3$; or a plastic scintillator, such as NE102 Polyvinyl Toluene. According to an embodiment, the scintillator material 214 can be an activated iodide crystal, such as a thallium-activated sodium iodide crystal. In an example, the scintillator material 214 is formed of a single crystal scintillator material. Alternatively, the scintillator material 214 can be an extruded scintillator material. The scintillator material 214 can have various shapes, such as a rectangular shape, or a cylindrical shape including flat end faces, such as rear face 218 and front face 220. The front face 220 is proximal to a window 226. In addition, the scintillator material 214 can have a side face 216. The surface finish of the scintillator material 214 can be sanded, polished, ground, etc., as desired.

In further reference to FIG. 2, the housing 212 can include a casing 222 that can be cylindrical or tubular to effectively fit the selected geometry of the scintillator material 214. Alternatively, the casing 222 has a cross-sectional shape, such as a circle or a polygon, for example, a triangle, a rectangle, a hexagon, an octagon, or an irregular polygon, or a combination thereof In addition, the casing 222 is an annular structure surrounding an interior cavity. An annular structure includes structures that have a circular or polygonal cross-section that surrounds an axis, such as a central axis. Radial directions are along a line extending from the axis to the casing 222, regardless of the cross-sectional shape or symmetry of the casing 222.

The casing 222 can be closed at its rear end by a back cap 224 and at its front end by an optical window 226. The optical window 226 can include a material that is transmissive to scintillation light given off by the scintillator material 214. According to one embodiment, the optical window 226 is made of crown glass or sapphire. The casing 222 and back cap 224 can be made of a non-transmissive material, such as a metal, metal alloy, or the like. As such, in one embodiment, the casing 222 and the back cap 224 are made of stainless steel, aluminum, or titanium. The back cap 224 can be coupled to the casing 222 using a sealant, mechanical fasteners, or by a vacuum type peripheral weld. According to a particular embodiment, the casing 222 can have a recess in the casing wall to form a welding flange 230, which facilitates fitting the back cap 224. Additionally, the back cap 224 can include an opening to its outer side such that annular grooves 234 and 236 are spaced slightly inwardly from the circumferential edge. Welding is performed at the outer ends of the welding flange 230 and the reduced thickness of a connecting portion 238 of welding flange 230 reduces heat conduction away from the welding flanges to permit formation of a desired weld.

The scintillator device 210 further includes an axial biasing member 240, a backing plate 242, a cushion pad 244, and an end reflector 246. The axial biasing member 240 functions to axially load the material 214 and bias it towards the optical window 226. In an embodiment, the axial biasing member 240 is formed of a wave spring, a stack of wave springs disposed crest-to-crest, or another suitable biasing member. Other suitable biasing members can include coil springs, Wavo® springs, resilient pads, pneumatic devices, or even devices incorporating a semi-compressible liquid or gel. Suitable materials for the axial biasing member 240 can include a metal, a metal alloy, polymers, or the like. In an example, the biasing member 240 is formed of stainless steel.

The backing plate 242 distributes the force of the axial biasing member 240 across the area of the cushion pad 244 for substantially uniform application of pressure and axial loading of the rear face 218 of the scintillator material 214. The cushion pad 244 can typically be made of a resilient material, such as a polymer, particularly an elastomer, such as, a silicone rubber. The thickness of the cushion pad 244 can vary within a range of 0.06 to 0.30 inches for most crystals ranging in diameter from 0.25 to 3.0 inches and for crystals ranging in length from 0.5 to 15 inches.

Additionally, the cushion pad 244 can be adjacent to the end reflector 246. The end reflector 246 can include a suitable reflecting material such as a powder, like aluminum oxide (alumina) powder, or a reflective tape or foil such as, a white porous unsintered PTFE material. A porous reflective material facilitates the escape of air or gas from between the reflector film and material face and can avoid pockets of trapped air or gas which could prevent the end reflector 246 from being pushed by the cushion pad 244 flat against the rear end face 218 of the scintillator material 214, which can have a negative impact on reflectivity at the reflector-material interface. In an example, the reflector material has a thickness in a range of 0.005 in to 0.03 in, such as 0.01 in to 0.03 in. According to particular embodiment, the reflecting material is a film that can be wrapped at least once around the material and possibly two or more times as desired. Alternatively, the end reflector 246 can be a metal foil disk, which conforms to the surface of the material end face 218 and provides suitable reflectance toward the optical window 226.

As indicated above, the biasing member 240 exerts a force on the scintillator material 214 to urge the scintillator material 214 towards the optical window 226, thereby maintaining suitable optical coupling between the scintillation material 214 and the optical window 226. An interface pad 252 optionally can be provided between the scintillator material 214 and the optical window 226 to facilitate effective optical coupling. According to one embodiment, interface pad 252 can include a transparent polymer material, such as a transparent silicone elastomer. The thickness of the interface pad 252 can be within a range of 0.06 to 0.30 inches for crystals ranging in diameter from 0.25 to 3.0 inches and in length from 0.5 to 15 inches.

Alternatively, the optical window 226 is adhered to the scintillator material 214. In a particular example, the window has a thickness in a range of 20 mil to 300 mil, such as 20 mil to 200 mil, or even 50 mil to 150 mil. The optical window 226 can be coupled with the front face 220 of the scintillator material 214 using an adhesive. For example, an adhesive having transparency and exhibiting low off-gassing at operating temperatures as high as 200° C. can be used to adhere the front face 220 of the scintillator material 214 to the optical window 226. An exemplary adhesive includes an epoxy or a silicone adhesive. The thickness of the adhesive is in a range of 5 mil to 30 mil, such as 10 mil to 30 mil, or even 10 mil to 20 mil.

In further reference to FIG. 2, as illustrated, the optical window 226 can be retained in the casing 222 by an annular lip 258 at the front end of the casing 222. The annular lip 258 can protrude radially inwardly from the casing wall 228 and can define an opening having a diameter less than the diameter of the optical window 226. Additionally, the annular lip 258 can have an inner beveled surface 260 and the optical window 226 can include a corresponding beveled, circumferential edge surface 262 that engages the inner beveled surface 260. The mating beveled surfaces can be hermetically sealed by a high temperature solder such as 95/5 or 90/10 lead/tin solder. The solder also aids in restraining the optical window 226 against axial push-out, in addition to providing a high temperature seal. The optical window 226 can be axially trapped between the annular lip 258 and the scintillator material 214 such that it can be radially constrained by the casing wall 222. Optionally, to permit wetting of the optical window 226 by the solder, the sealing edge surfaces of the optical window 226 can include a metalized coating such as platinum.

According to the illustrated embodiment of FIG. 2, the inner beveled surface 260 can forwardly terminate at an edge 266 and rearwardly at a cylindrical surface 268. The cylindrical surface 268 closely surrounds a portion of the optical window 226 and extends axially inwardly to a cylindrical surface 270, which extends axially to the flange 230 at the opposite end of the casing 222. The interface of the optical window 226 is aligned with the annular shoulder formed between the cylindrical surfaces 268 and 270.

According to another embodiment, a reflector 274 can be disposed over at least a portion of the scintillator material 214 at its surface 216. For example, the scintillator material 214 at its surface 216 can be substantially surrounded by a reflector 274. The reflector 274 can incorporate materials as described above in accordance with the end reflector 246, such as a porous material including a powder, foil, metal coating, or polymer coating. According to one embodiment, the reflector 274 is a layer of aluminum oxide (alumina) powder. In another embodiment, the reflector 274 is a self-adhering white porous PTFE material. As noted above, air or gas that might otherwise be trapped between the end reflector 246 and the scintillator material 214 can escape through the porous reflector 274.

In accordance with a particular embodiment, the reflector 274 is a preformed sheet containing a fluorinated polymer. In one embodiment, the fluorinated polymer can include a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylene, ethylenechlorotrifluoroethylene, and mixtures of such fluoropolymers. In one particular embodiment, the reflector 274 is made essentially of a fluorinated polymer. In another more particular embodiment, the reflector 274 is made essentially of polytetrafluoroethylene (PTFE).

In one embodiment, the reflector 274 can be substantially surrounded by a liner (not illustrated) disposed between the outer surface of the reflector 274 and the inner surface 277 of an optional radial biasing member 276. Such a liner can include a metal material, particularly a thin metal liner such as a foil. In accordance with a particular embodiment, the coating material can include aluminum foil.

In addition to the reflector 274 surrounding the scintillator material 214, a radial biasing member 276 can substantially surround the scintillator material 214. The radial biasing member 276 can surround and exert a radial force on the reflector 274 and the scintillator material 214. As shown, the radial biasing member 276 can be cylindrical to accompany the selected shape of the scintillator material 214. Alternatively, the radial biasing member 276 can have a cross-section that approximates the shape of the cross-section of the casing 222. The surface contour of the radial biasing member 276 can vary along the length to provide a biasing force thereby enhancing the stabilization of the scintillator material 214 within the casing 222. For example, the radial biasing member 276 can have protrusions, elements, or other shaped irregularities on the inner surface 277, the outer surface 278, or both surfaces to bias the scintillator material 214 relative to the casing 222. The radial biasing member is discussed in more detail below.

As also illustrated, the scintillator device 210 can include a ring 290 that extends from the front end of the radial biasing member 276 to the optical window 226. The ring 290 facilitates stabilization and alignment of the circular interface pad 252 during assembly of the scintillator device 210. The ring 290 has an axially inner end portion 292 substantially surrounding the scintillator material 214 and an axially outer end portion 294 substantially surrounding the interface pad 252. The intersection of the interior surfaces of the axially inner end portion 292 and the axially outer end portion 294 can include a shoulder 296, which facilitates positioning of the ring 290 on the scintillator material 214 during assembly. Alternatively, the scintillator device can be free of the ring 290 or the ring 290 can be incorporated as part of the radial biasing member 276 or casing 222.

In certain embodiments, the ring 290 can be made of resilient material, including an organic material, such as an elastomer. In one particular embodiment, the ring 290 is in direct contact with the inner surface of the casing 222 and the outer surface of the scintillator material 214, but may not necessarily provide a hermetically sealing interface between the scintillator material 214 and the radial biasing member 276.

Moreover, the ring 290 can include additional materials, often located within the inner surface and abutting the scintillator material 214 to enhance the reflection of the ring 290. Such materials can include, for example, alumina or PTFE (Teflon™). The ring 290 and the radial biasing member 276 can alternatively be integrated together as a continuous integral component.

In further reference to the components of the scintillator device 210 illustrated in FIG. 2, an optional sleeve 298 extends longitudinally from the optical window 226 to approximately the back cap 224. The sleeve 298 can substantially surround the radial biasing member 276 and scintillator material 214 and in a compressed state (when fitted within the casing 222) provides a radially compressive force to the radial biasing member 276 and scintillator material 214. According to one embodiment, insertion of the sleeve 298 into the casing 222 requires compression of the sleeve 298 thereby providing a radially compressive force on the material 214. Suitable materials for the sleeve 298 include materials, such as a metal, metal alloy, a polymer, carbon or the like. Additionally, the sleeve 298 can include a material that has a lower coefficient of friction with the material of the casing 222 than does the material of the radial biasing member 276 with the material of the casing 222.

In a particular embodiment, the radiation detector can be a ruggedized detector. A ruggedized detector is rated for high temperature environments and high vibration and shock conditions. In a particular example, a ruggedized detector is rated for use at temperatures to at least 165° C., such as at least 185° C., at least 190° C., or even as high as 200° C. or higher. Particular embodiments of the ruggedized detector are operable at temperatures of at least 205° C., such as at least about 225° C., or even at least about 260° C. Further, the ruggedized detector can be rated for shock (Shock Rating) to at least 800 G at 1 ms, such as at least 900 G, or even as high as 1000 G, when tested in accordance with Mil-STD-810E Method 516.4 using a pneumatic shock machine available from Avex. The ruggedized detector can also be rated for random vibration (Vibration Rating) to at least 15 G(rms) at 30-1000 Hz, such as 20 G(rms), and periodic vibration to at least 20 G(peak) at 30-1000 Hz, such as 30 G(peak), when measured in accordance with Mil-STD-810E Method 514.4 using an electrodynamic shaker available from Unholtz-Dickie or LDS.

In an exemplary embodiment, the radial biasing member or the casing includes a plurality of elements extending from a base material. Herein, a cover is defined to include either a radial biasing member, a casing, or a housing. In an example, the cover includes a tolerance ring that includes corrugated elements that extend from the base material. In another example, the elements are punch out flaps pivotably connected to the base material and extending from one or both of the outward or inward surfaces of the cover. In a further example, the elements include hook or loop elements extending from one or both of the outward surface or inner surface of the cover. In particular, the cover is a casing that can include the plurality of elements, such as the hook or loop elements, and the detector can be free of the radial biasing member and sleeve.

Figure 3:
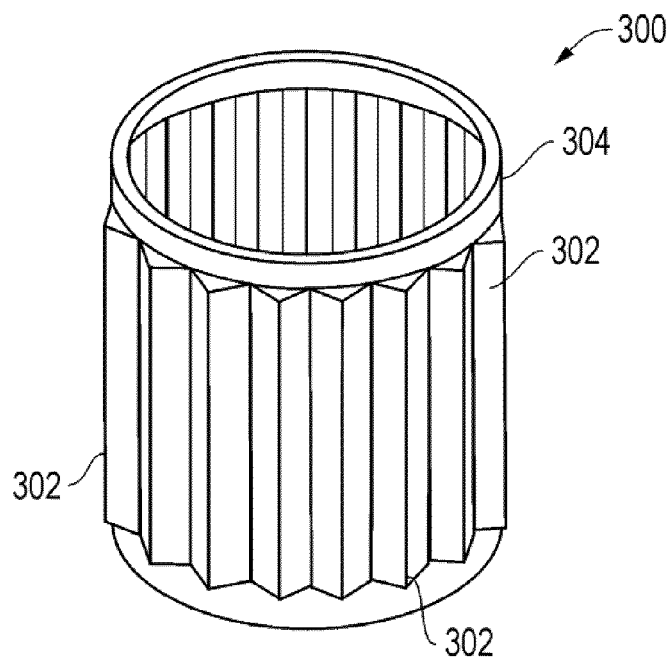
FIG. 3 and FIG. 4 include illustrations of exemplary radial biasing members according to an embodiment.
Figure 4:
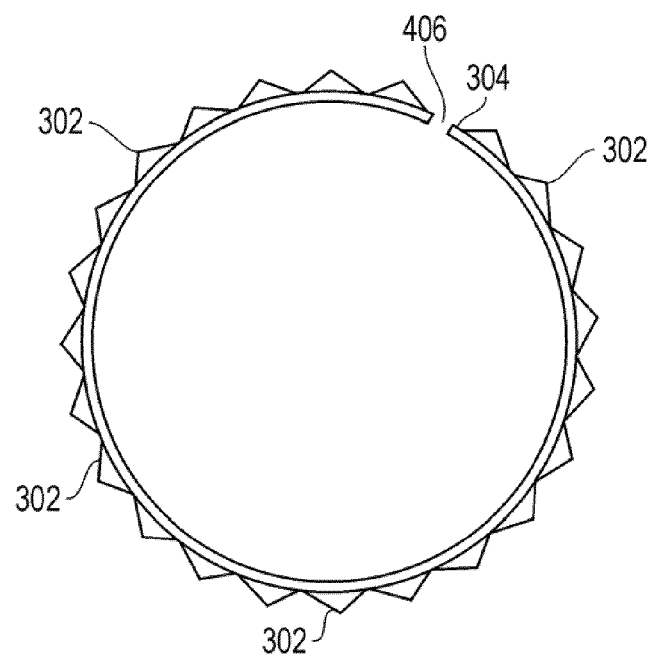

As illustrated in the embodiment of FIG. 3 and FIG. 4, the radial biasing member is a tolerance ring 300. The tolerance ring 300 includes a corrugated base strip 304 extending circumferentially within an annular space. In an example, the tolerance ring 300 can be formed of a metal, such as aluminum, stainless steel, titanium, beryllium, copper, an alloy thereof, or a combination thereof. In another example, the tolerance ring 300 can be formed of a polymeric material, such as a polyolefin such as polyethylene or polypropylene, a polyester, a silicone polymer such as a highly cross linked silicone rubber, a polyamide, a polyaramide, a polyimide, a fluoropolymer, or any combination thereof.

In particular, the corrugated elements 302 extend from the base strip 304 in a radial direction. As illustrated in FIG. 4, the corrugated elements 302 extend in a radially outward direction from a radially outer surface of the base strip 304. As such, the base strip 304 is in contact with the reflective material overlying the scintillator material. Alternatively, the corrugated elements 302 can extend in a radially inward direction from a radially inner surface of the base strip 304. In a further example, corrugations within the base strip 304 can extend to form a set of elements extending radially inward and a set of elements extending radially outward. In a particular example, the tolerance ring 300 may have between 8 and 64 corrugated elements, such as between 10 and 32 corrugated elements, between 10 and 26 corrugated elements, or even between 12 and 18 corrugated elements.

In a further example, the corrugated elements 302 protrude in a radial direction and form ridges that extend parallel to an axis of the scintillator material. In another example, the ridges extend longitudinally along the scintillator material at an angle relative to the axis of the scintillator material.

In an example, the tolerance ring has a diametral clearance, defined as the difference between the minimum inside diameter and the maximum outside diameter, in a range of 0.03 in to 0.190 in, such as a range of 0.03 in to 0.1 in. In an particular example, the tolerance ring 300 is formed of a sheet material having a thickness in the range of 1 mil to 100 mil, such as a range of 2 mil to 50 mil, a range of 2 mil to 20 mil, or even 2 mil to 10 mil. In another example, the tolerance ring 300 can have a radial capacity in a range of 10 lbs to 5000 lbs, such as a range of 200 lbs to 3000 lbs, or even a range of 1000 lbs to 3000 lbs. In a further example, the tolerance ring can have a torque capacity in a range of 10 in-lbs to 3000 in-lbs, such as a range of 50 in-lbs to 3000 in-lbs, or even a range of 200 in-lbs to 3000 in-lbs. In a further example, the tolerance ring 300 may have a spring rate per corrugated element (wave) in a range of 500 lbs/in to 20,000 lbs/in, such as a range 1000 lbs/in to 15,000 lbs/in, a range of 1500 lbs/in to 12,000 lbs/in, or even a range of 1500 lbs/in to 5000 lbs/in. In addition, the tolerance ring may include a gap 406 extending axially along its annular structure. The gap may be in a range of 0.010 in to 0.1 in, such as a range of 0.04 in to 0.08 in. In a further example, the tolerance ring can have a thermal expansion rate similar to that of the scintillator material.

Figure 5:
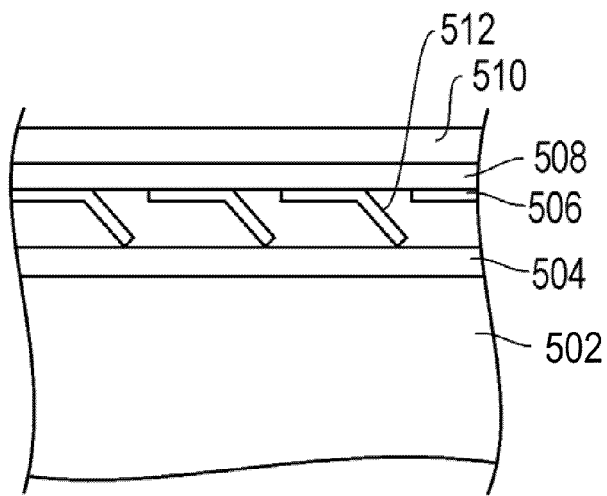
FIG. 5 and FIG. 6 include illustrations of exemplary radial biasing member.

In a further example, the radial biasing member can include a base material and a set of radially extending flaps. In an exemplary embodiment illustrated in FIG. 5, a scintillator material 502 is disposed within a housing 510. A reflective layer 504, a radial biasing member 506, and optionally, a sleeve 508 are disposed between the scintillator material 502 and the housing 510. In the illustrated example, the radial biasing member 506 includes a plurality of flaps 512 extending to and contacting the reflective layer 504 and biasing the scintillator material 502 to align with an axis (not shown). While the flaps 512 are illustrated as extending in a radially inward direction from a radially inner surface of the radial biasing member 506, the flaps 512 can alternatively extend radially outwardly from an outer surface of the radial biasing member 506. In such an example, the radial biasing member 506 includes a base that is in contact with the reflective layer 504 and the flaps 512 extend to contact the optional sleeve 508 or the housing 510.

In an example, the radial biasing member 506 can be formed of a polymeric material or a metallic material. An example of a polymeric material can include a polyolefin such as polyethylene or polypropylene, a polyester, a silicone polymer such as a highly cross linked silicone rubber, a polyamide, a polyaramide, a polyimide, a fluoropolymer, or any combination thereof. An example of a metal can include stainless steel, titanium, aluminum, beryllium, copper, or an alloy or a combination thereof.

Figure 6:
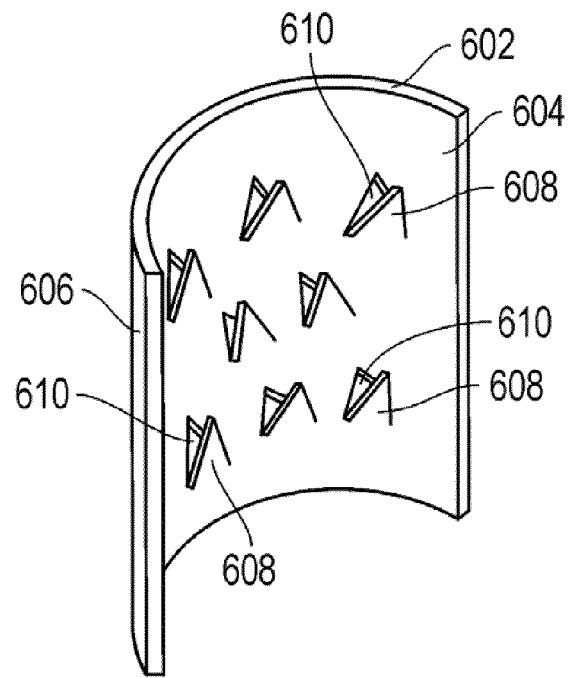

In a particular embodiment illustrated in FIG. 6, the flaps 608 can be formed by punch cutting flaps from a base material. FIG. 6 includes an illustration of a perspective view of a portion of a radial biasing member 602. In the illustrated example, the radial biasing member 602 includes an inner surface 604 having a concave contour and an outer surface 606 having a convex contour. As illustrated, a plurality of flaps 608 extends from the base material of the radial biasing member 604. The flaps 608 are cut from the base material leaving holes 610.

As illustrated, the flaps 608 extend from the base material in a radial inward direction from the inner surface 604 of the radial biasing member 602. Alternatively, the flaps 608 can extend from the outer surface 606 in a radially outward direction. In a further example, a set of flaps 608 can extend in a radially inward direction and a set of flaps can extend in a radially outward direction.

As illustrated in FIG. 6, the flaps have a triangular shape. Alternatively, the flaps can exhibit other shapes. As illustrated in FIG. 7, a flap 702 can have a polygonal shape, such as a triangular shape. As illustrated in FIG. 8, a flap 802 can have a semi-circular shape or alternatively, as illustrated in FIG. 9, a flap 902 can have a rectangular or square shape. As illustrated in FIG. 7, FIG. 8, and FIG. 9, each of the flaps (702, 802 and 902) extend in a longitudinal direction L, which correlates with the direction the flap extends from the base material. In addition, each flap has a width W, which is representative of the direction along which the flap is attached to the base material. In addition, each flap has a thickness represented as the thickness T of the material that is punch cut. With respect to such flaps, an aspect ratio is defined as the ratio of the longitudinal direction to the thickness of the flap. In an example, the aspect ratio of the flaps is at least 4. For example, the aspect ratio can be at least 8, such as at least 16, or even at least 32. In an example, the aspect ratio is not greater than 200.

Returning to FIG. 6, the radial biasing member 602 can include at least 20 flaps. For example, the radial biasing member 602 can include at least 40 flaps or even at least 80 flaps. In a particular embodiment, the radial biasing member 602 can include at least 160 flaps. In an example, the radial biasing member 602 includes not greater than 10,000 flaps.

In particular, the flaps 608 are coupled to the base layer of the radial biasing member 602 in a manner that permits the flaps 608 to pivot. In other words, the flaps 608 are pivotably attached to the base layer. As illustrated in FIG. 10, a flap 1004 can be attached to a base 1002 at a pivot attachment 1006, forming an angle a between the direction the flap 1004 extends and the base layer 1002. Under radial compression, the flap 1004 at least partially flexes and the angle a changes, resulting in opposing force biasing the scintillator material to align with an axis.

In a particular example, the initial angle a can influence the response of the flap 1004 under compression. For example, a smaller initial a can provide a lower spring ratio, i.e. the ratio of opposing force divided by the change in angle. For initial angles approaching 90°, the spring ratio can be influenced by the compressive strength of the material, resulting in a higher spring ratio. For an angle α greater than 90°, such as angles of at least about 110°, the spring ratio can be advantageously lower than the spring ratio of flaps having an initial angle α of 90°, while being higher than the spring ratio of flaps having initial angles less than 70°.

In an alternative embodiment, the elongated elements can be hook or loop elements extending from the cover, such as the housing or a radial biasing member. For example, FIG. 11 includes an illustration of housing 1110 including hook elements 1112 or loop elements 1114. As illustrated in FIG. 11, a scintillator material 1102 is disposed within the housing 1110. A reflective material 1104 is disposed on the scintillator material 1102 and hook elements 1112 or loop elements 1114 extend from the housing to contact the reflective material 1104. The housing 1110 having the loop elements 1114 or the hook elements 1112 biases the scintillator material 1102 to align with an axis, such as a central axis of the scintillator housing 1110. Alternatively, the hook or loop elements (1112 or 1114), can be disposed on a radial biasing member disposed between the housing 1110 and the scintillator material 1102. Optionally, a sleeve can surround the radial biasing member. As illustrated, the hook elements 1112 or loop elements 1114 extend from the housing 1110 in a radially inward direction from a radially inner surface of the housing 1110. Alternatively, the hook or loop elements (1112 or 1114) can extend in a radially outward direction from a radially outward surface of a radial biasing member.

In a particular example, the housing, including the loop elements 1114 or the hook elements 1112 can be formed of a metallic material, such as aluminum, stainless steel, titanium, beryllium, copper, or alloys or a combination thereof. Alternatively, a radial biasing member can be formed of a material such as a plastic material. An example of a polymeric material can include a polyolefin such as polyethylene or polypropylene, a polyester, a silicone polymer such as a highly cross linked silicone rubber, a polyamide, a polyaramide, a polyimide, a fluoropolymer, or any combination thereof.

As illustrated in FIG. 12, each hook or loop 1204 is coupled to a base layer 1202 at a point 1206. As the hook or loop 1204 is compressed, an angle a, defined between the base layer material 1202 and the hook or loop 1204, changes or the hook or loop 1204 can deform along its longitudinal axis in addition to providing a change in angle. In particular, the compressive force results in a change in the angle near the pivot point 1206.

In addition, the hook or loop has a high aspect ratio. For example, FIG. 13 includes an illustration of a hook 1302. A longitudinal axis L of the hook 1302 extends along the extension of the hook 1302. The hook or loop 1302 has a characteristic diameter D parallel to a cross sectional area of the hook or loop 1302, which is perpendicular to the longitudinal axis L. An aspect ratio is defined as the ratio of the length of the hook or loop 1302 along its longitudinal axis divided by its characteristic diameter. In an example, the hook or loop 1302 has an aspect ratio of at least 4. For example, the aspect ratio can be at least 8, such as least 16, or even at least 32. In an embodiment, the aspect ratio is not greater than 200.

Returning to FIG. 11, the housing 1110 or a radial biasing member (not shown) can include a plurality of hooks or loops, 1112 or 1114, or a combination thereof. In particular, the housing 1110 or a radial biasing member can include at least about 20 hooks or loops, such as at least about 40 hooks or loops, at least about 80 hooks or loops, or even at least about 160 hooks or loops. In an example, the housing 1110 or radial biasing member includes not greater than 10,000 elements.

In a particular embodiment, the high aspect ratio elements disclosed above provide particular technical advantages. The pivotably connected high aspect ratio elements provide a desirable spring rate or compression rate that advantageously results in an improved scintillator material life and durability under harsh environments. Further, the greater relative mechanical deformation of high aspect ratio elements can lead to more efficient dampening of resonant vibrations. In contrast, solid materials and low aspect ratio protrusions provide an undesirably high compression ratio in part due to the nature of their deformation. The present high aspect ratio elements advantageously are used in harsh environments, reducing the risk of scintillator material fracture or scintillator material deformation. In addition, the cover including the tolerance ring or elongated elements can be formed entirely of metal, eliminating the use of elastomers. As a result, the temperature rating can be higher and the detector can be easier to form. In an example, such high aspect ration elements in a radial biasing member are particularly useful in a harsh environment such as those environments associated with the ratings specified above. For example, particular high aspect ratio elements maintain spring constant or resiliency at temperatures of at least 205° C.

Figure 14:
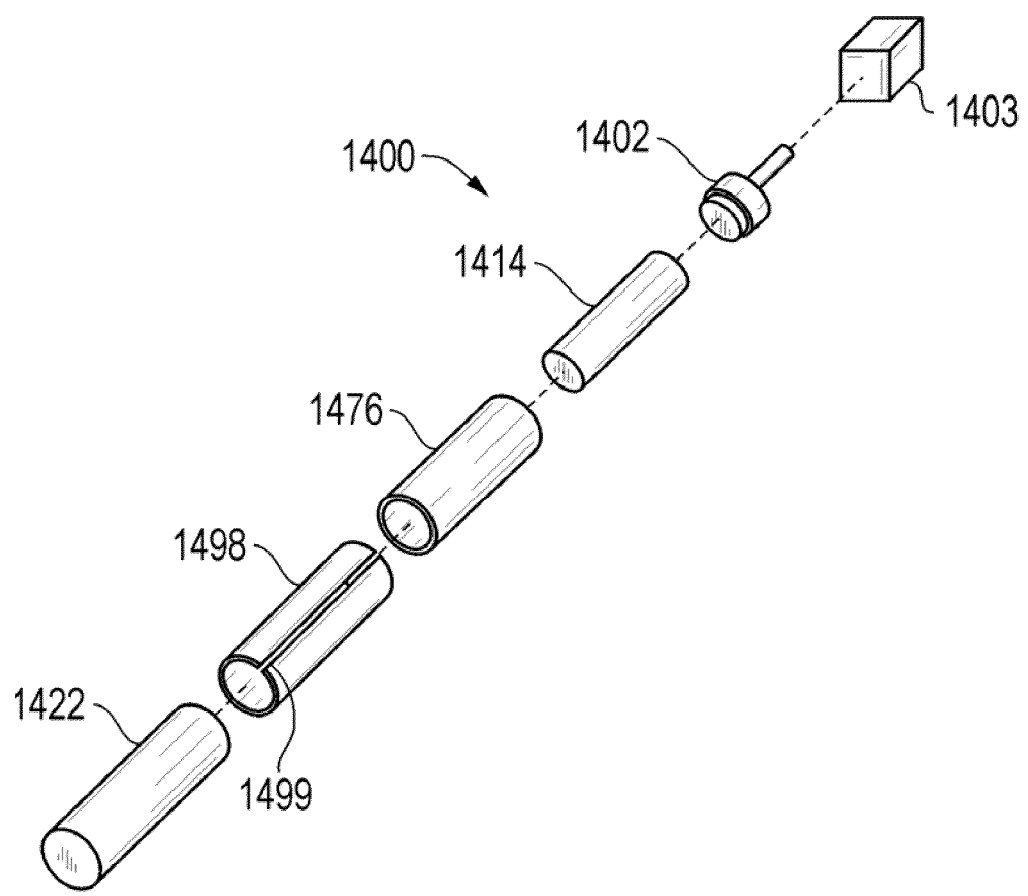
FIG. 14 includes an exploded view of a scintillator device according to one embodiment.

FIG. 14 provides an exploded view 1400 of an arrangement of component layers of the scintillator device according to one embodiment. Optionally, a sleeve can be used to guide a radial biasing layer, a reflective layer and scintillator material into a housing. As illustrated in FIG. 14, a sleeve 1498 can be slotted along its longitudinal length, thereby providing a longitudinally extending gap 1499. The width of the longitudinally extending gap 1499, when the radial biasing member 1476 is disposed within the sleeve 1498 without any externally applied compression, can vary and can be wide. However, when a radially compressive force is applied and the sleeve 1498 and radial biasing member 1476 are inserted into the casing 1422, the width of the longitudinally extending gap 1499, can be zero or near zero. The sleeve 1498 can be compressible in other suitable ways, for example, the sleeve 1498 can be fluted or crimped to allow for radial compression of the sleeve 1498 along its axial length.

In further reference to the sleeve 1498, the thickness of the sleeve 1498 along the longitudinal direction can be selected thereby providing for controlled radial loading along the length of the scintillator material 1414. To increase or decrease the amount of radial loading the thickness of the sleeve 1498 can be increased or decreased accordingly, wherein a thicker sleeve increases the radial loading on the scintillator material 1414 and a thinner sleeve decreases the radial loading on the scintillator material 1414.

FIG. 14 further provides a particular assembly of the scintillator device 1400 according to one embodiment. After applying a reflector to the scintillator material 1414, the subassembly of the reflector and scintillator material 1414 can be inserted into the radial biasing member 1476 and this subassembly can be inserted in the sleeve 1498 to form a scintillator material 1414-radial biasing member 1476-sleeve 1498 subassembly. Before insertion of such a subassembly into the casing 1422, the sleeve 1498 can be in an uncompressed state, and the diameter of the sleeve 1498 can be greater than the inside diameter of the metal casing 1422. A radial compressive force can be applied to the scintillator material 1414-radial biasing member 1476-sleeve 1498 subassembly during insertion into the casing 1422. To facilitate insertion, a forcing mechanism 1402 can be used. The forcing mechanism 1402, can apply an axial force to the scintillator material 1414-radial biasing member 1476-sleeve 1498 subassembly, and can include devices such as a hydraulic ram or push rod 1402 coupled to a conventional control apparatus 1403.

Figure 15:
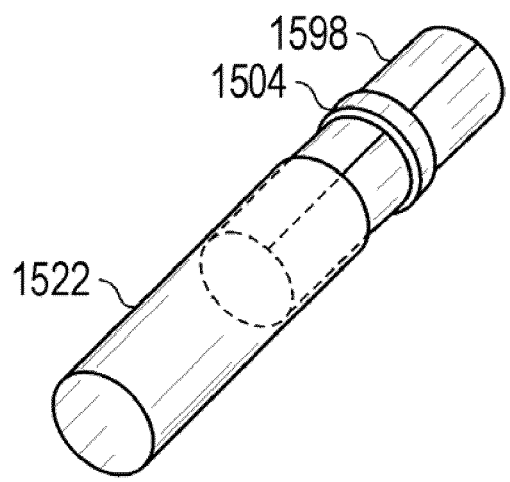
FIG. 15 includes a perspective diagram of a portion of a scintillator device according to one embodiment.

Referring to FIG. 15, the incremental compression of the scintillator material 1414-radial biasing member 1476-sleeve 1498 subassembly (illustrated in FIG. 14 and denoted 1598) during insertion into the casing 1522 can be facilitated by use of a clamp 1504. The clamp 1504 can include various devices capable of exerting a radially compressive force, such as a radial clamp or compression ring. The clamp 1504 can be adjusted to change positions along the longitudinal length of the subassembly 1598 during insertion of the subassembly 1598 into the casing 1522. The size of the clamp 1504 can depend upon the size of the subassembly 1598 and the rigidity of the sleeve 1498 and the desired compressive force suitable for effective insertion of the subassembly 1598 into the casing 1522. Additionally, the axial rigidity of the sleeve 1498 can impact the location at which the radial clamp 1504 is applied to the sleeve 1498. Accordingly, the subassembly 1598 can be progressively inserted at increments ranging from 0.25 inches to 1.0 inch, or more.

In further reference to the coupling of the components of the subassembly 1598 within the casing 1522, the sleeve 1498/casing 1522 interface has a reduced coefficient of friction relative to the coefficient of friction of a typical casing 1522/radial biasing member 1476 interface which would exist without the sleeve 1498. As such, the reduced coefficient of friction facilitated by incorporation of a sleeve 1498 to form a sleeve 1498/casing 1522 interface facilitates assembly of the device and reduces the potential for damage to the components of the subassembly 1598. Moreover, provision of the sleeve 1498/casing 1522 interface provides a suitable radial loading for stabilization of the device during operation.

Alternatively, when the casing includes elongated elements, such as hook or loop elements, a reflective material can be placed over the side or rear surfaces of the scintillator material and the reflective material/scintillator material inserted into the casing. In another example, when a tolerance ring is used, a reflective material can be disposed over the side of the scintillator material and the reflective material/scintillator material inserted into a tolerance ring. The tolerance ring can be inserted into a housing. Optionally, the tolerance ring, the reflective material, and the scintillator material can be inserted into a sleeve that is subsequently inserted into the housing.

Provision of a scintillator device in accordance with the embodiments described herein is suitable for reducing vibration induced counts associated with the harsh environmental conditions of industrial applications, particularly in drilling applications. Suitable biasing and stabilization (both axial and radial stabilization) of the scintillator device in combination with select materials of component parts reduces vibration induced counts, and enhances the accuracy and precision of the scintillator device. Alternatively, the enhanced radial and axial stabilization and stiffness can cause vibration induced counts to occur at higher excitation frequencies, such as at frequencies above a threshold frequency, i.e., above the operational dynamic bandwidth of the detector. Accordingly, fewer vibrations to the scintillator device are capable of causing the necessary frequency to cause a vibration induced count and therefore vibration induced counts are reduced. In addition, provision of a scintillator device in accordance with embodiments described herein provide for improved 360 degree symmetry when exposed to gamma radiation, leading to improved collection and thus, improved sensitivity.

In the context of detectors, the embodiments described herein provide advantageous technical features. For example, vibration induced false counts are reduced and sensitivity is increased in a scintillator device having the same housing dimensions. In addition, scintillator life and durability is improved. It is believed that such improvements are related to the nature of the embodiments of the radial biasing members and casings described herein. In particular, the detector achieves a vibration rating, determined in accordance with the method of Example 1, of pass.

In addition, the detector may achieve an azimuthal attenuation performance, defined as the standard deviation of the azimuthal percent transmission for angles between 0° and 360° determined with a 662 keV energy source, of not greater than 0.5, such as not greater than 0.2, not greater than 0.1, or even not greater than 0.01.

Such advantageous features are particularly relevant for ruggedized detectors. A ruggedized detector is rated for high temperature environments and high vibration and shock conditions. In particular, a ruggedized detector is rated for use at temperatures to at least 185° C., such as at least 190° C., or even at least 205° C. In particular, the ruggedized detector may be rated for temperatures of at least 225° C., or even at least 260° C. The term "temperature rating" indicates that a tested device can withstand the stated temperature without substantial deterioration over a period of 2 hours. In an example, substantial deterioration includes a permanent reduction in the sensitivity of detector, such as at least a 5% reduction in sensitivity. Further, a ruggedized detector is rated for shock of at least 800 G at 1 ms, such as at least 900 G, or even as high as 1000 G, when tested in accordance with Mil-STD-810E Method 516.4 using a pneumatic shock machine available from Avex. The term "shock rating" indicates that a tested device can withstand the stated shock when tested in accordance with the above method. The ruggedized detector is also rated for random vibration of at least 15 G(rms) at 30-1000 Hz, such as 20 G(rms), and periodic vibration of at least 20 G(peak) at 30-1000 Hz, such as 30 G(peak), when measured in accordance with Mil-STD-810E Method 514.4 using an electrodynamic shaker available from Unholtz-Dickie or LDS. The term "vibration rating" indicates that a tested device can withstand the stated vibration when tested in accordance with the above method.

In particular embodiments including metal rings or elements, the rings or elements are less likely to retain or set in a deformed shape with long exposure to temperature. Thus, such rings or elements are more likely to exert radial force, even after exposure to high temperature environments.

EXAMPLES

Example 1

A detector is subjected to a sine vibration test on an electrodynamic shaker. A radial biasing member in the form of a tolerance ring as illustrated in FIG. 3 is included as part of the detector. The theoretical spring rate per wave for the tolerance ring is approximately 2,395 lbs/in deflection. The tolerance ring has 16 waves.

During the test, the detector is mounted to the slip table of the shaker via a fixture. The vibration level of the test is 38 gpk for 30-1000 hz. The detector is run in the two transverse directions (0° and 90°) relative to the axis of the shaker. The test is performed for a period of 2.5 minutes for each direction.

Figure 16:
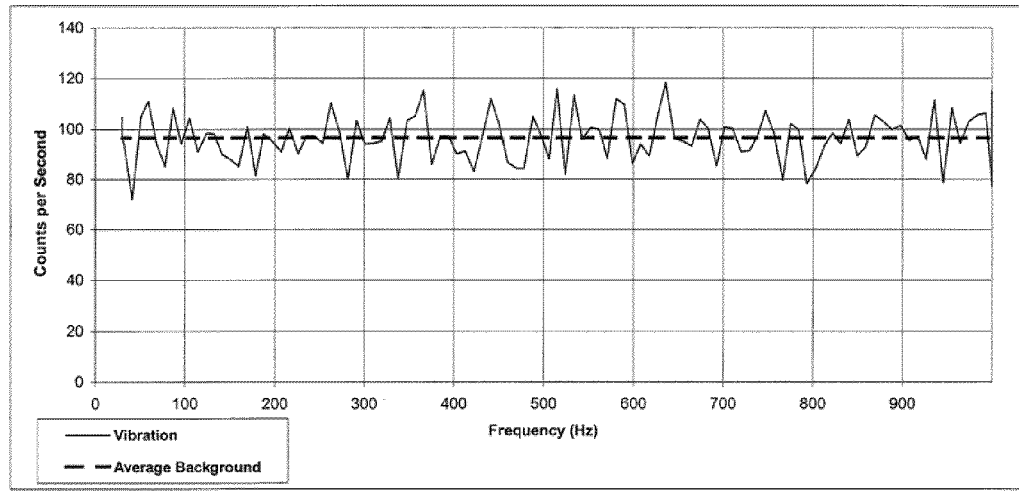
FIG. 16 and FIG. 17 include graph illustrations of counts during vibration testing.
Figure 17:
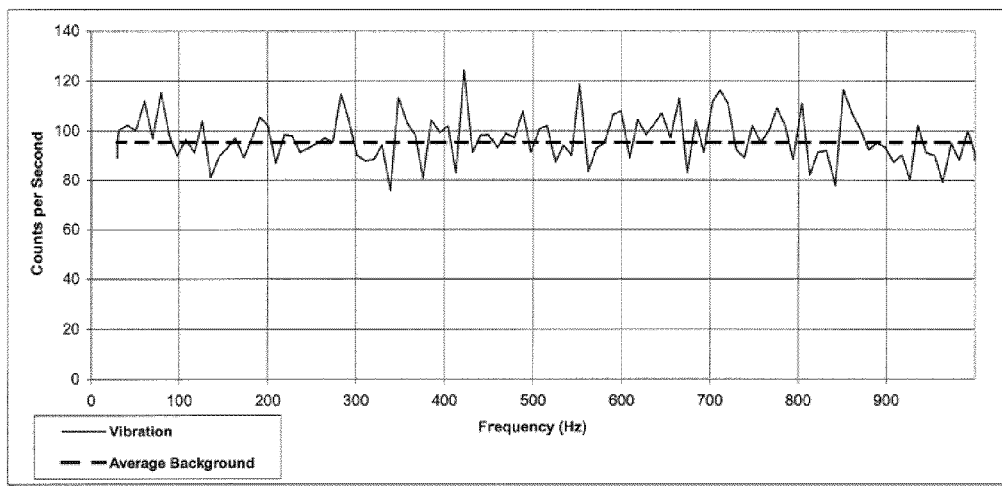

The average counts per second of the detector before vibration is compared with the average counts per second (cps) of the detector during vibration, as illustrated in FIG. 16 and FIG. 17. In the 0° transverse direction (FIG. 16), the average cps before vibration is 96.5 cps and the average cps during vibration is 96.5 cps. In the 90° transverse direction (FIG. 17), the average cps before vibration is 95.4 cps and the average cps during vibration is 96.8 cps. As such, few false counts result from vibration. To achieve a rating of pass, the average cps of the detector during vibration can not exceed 2 times the square root of the average cps before vibration. The detector has a rating of pass.

Example 2

Detectors are tested for azimuthal attenuation. Each detector includes a 32.5 mil stainless steel housing. A first detector includes a radial biasing member in the form of a tolerance ring, as illustrated in FIG. 3. The theoretical spring rate per wave for the tolerance ring is approximately 2,395 lbs/in deflection. The tolerance ring has 16 waves and is formed of 8 mil thick stainless steel. A second detector includes commercially available steel linear spring plates having a thickness of 15 mils secured by an aluminum retainer having a thickness of 8 mils.

Figure 18:
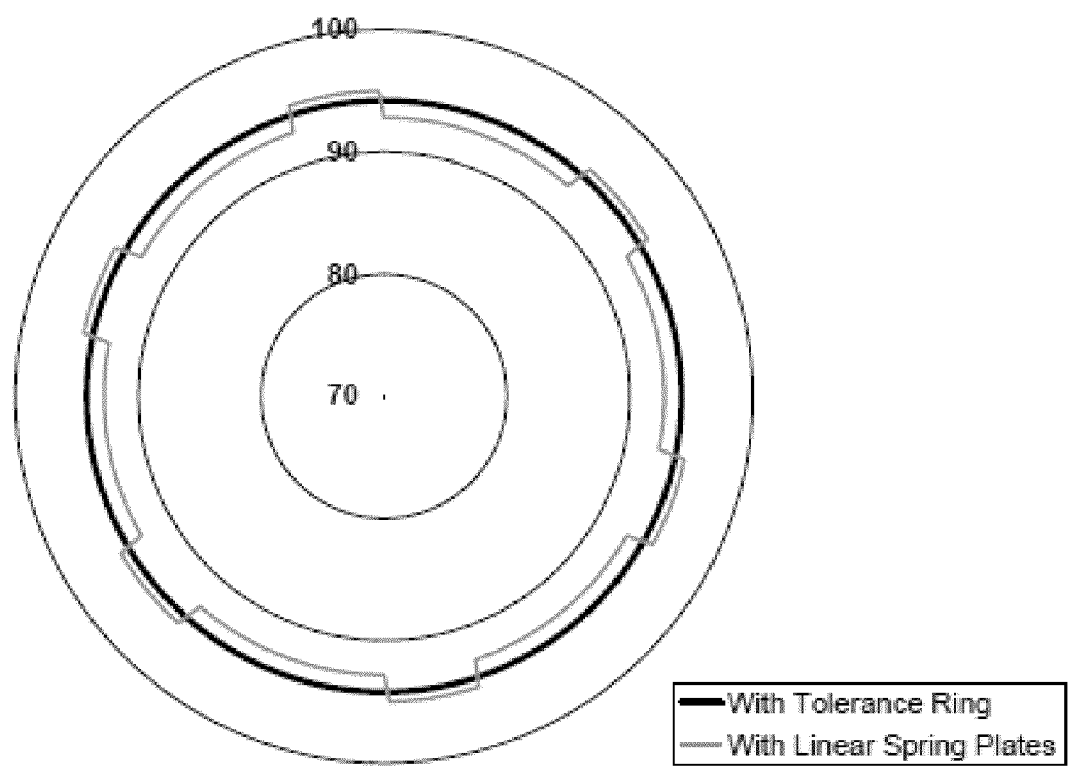
FIG. 18 includes an graph of azimuthal attenuation for detectors.

Testing is performed using a 663 keV energy source. As illustrated in FIG. 18, the attenuation associated with the first detector is uniform in each azimuthal direction. The attenuated signal strength averages 94.2% of the total with a standard deviation significantly less than 0.1 for angles between 0° and 360°. In contrast, the second detector exhibits significant deviation depending on the azimuthal direction. The second detector has an average attenuation of 93.8% and has a standard deviation of at least 1.0 for angles between 0° and 360°.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A detector comprising:
   a housing defining a cavity;
   a scintillator material disposed within the cavity and having a front face, a rear face, and a side face;
   a reflective material disposed between the housing and the side face of the scintillator material; and
   a tolerance ring disposed between the housing and the reflective material, the tolerance ring in substantially continuous contact along the length of the scintillator material and exerting a radial force along the side face of the scintillator material, wherein the tolerance ring has a spring rate per wave in a range of 500 lbs/in to 20,000 lbs/in.

2. The detector of claim 1, further comprising a sleeve disposed between the housing and the tolerance ring.

3. The detector of claim 1, wherein the tolerance ring has a diametral clearance in a range between 0.03 in and 0.190 in.

4. The detector of claim 1, wherein the tolerance ring has a radial capacity in a range of 10 lbs to 5000 lbs.

5. The detector of claim 4, wherein the radial capacity is in a range of 1000 lbs to 3000 lbs.

6. The detector of claim 1, wherein the tolerance ring has a torque capacity in a range of 1 in-lbs to 3000 in-lbs.

7. The detector of claim 6, wherein the torque capacity is in a range of 200 in-lbs to 3000 in-lbs.

8. The detector of claim 1, further having a temperature rating of at least 205° C.

9. The detector of claim 1, wherein the detector has a vibration rating of pass.

10. The detector of claim 1, wherein the detector has a azimuthal attenuation performance of not greater than 0.5.

11. The detector of claim 1, wherein the tolerance ring has a plurality between 8 and 64 of corrugated elements.

12. A method of forming a detector, the method comprising:
   placing a reflective material over at least a portion of a side face of a scintillator material;
   inserting the reflective material and the scintillator material into a tolerance ring having a plurality of corrugated elements, wherein the plurality of corrugated elements extend only away from the scintillator material and the tolerance ring being in substantially continuous contact along the length of the scintillator material, wherein the tolerance ring has a spring rate per wave in a range of 500 lbs/in to 20,000 lbs/in;
   and inserting the tolerance ring into a housing.

13. The method of claim 12, further comprising inserting the tolerance ring, reflective material and the scintillator material into a sleeve prior to inserting the sleeve into the housing.

14. The method of claim 12, wherein the tolerance ring has a radial capacity in a range of 10 lbs to 5000 lbs.

15. The method of claim 12, wherein the tolerance ring has a torque capacity in a range of 1 in-lbs to 3000 in-lbs.

16. The method of claim 12, wherein the tolerance ring has a diametral clearance in a range 0.03 in to 0.190 in.

17. A detector comprising:
   a housing defining a cavity;
   a scintillator material disposed within the cavity and having a front face, a rear face, and a side face;
   a reflective material disposed between the housing and the side face of the scintillator material; and
   a tolerance ring disposed between the housing and the reflective material, the tolerance ring in substantially continuous contact along the length of the scintillator material and having a plurality of corrugated elements, wherein the tolerance ring has a spring rate per corrugated element in a range of 500 lbs/in to 20,000 lbs/in.

* * * * *